Aug. 16, 1955　　　　　E. A. JUZWIAK　　　　　2,715,482
FERTILIZER SPREADERS AND THE LIKE
Filed July 23, 1953　　　　　　　　　　　　　2 Sheets-Sheet 2
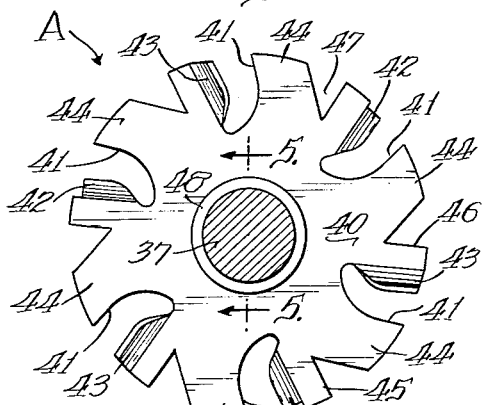
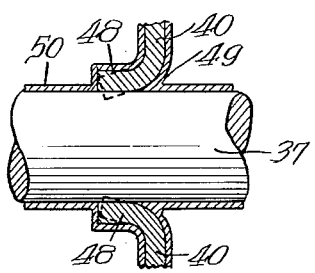
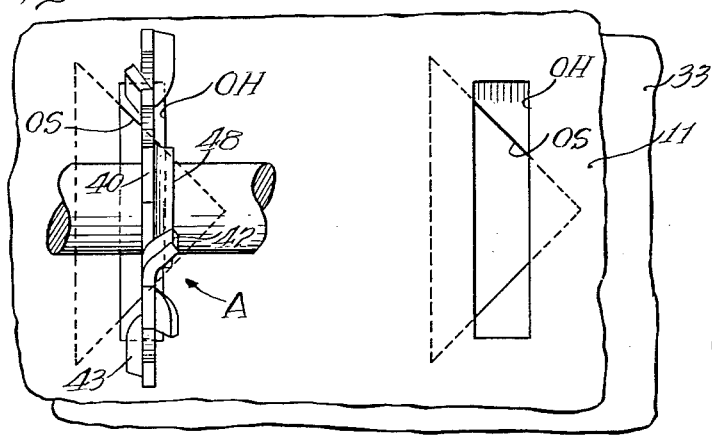
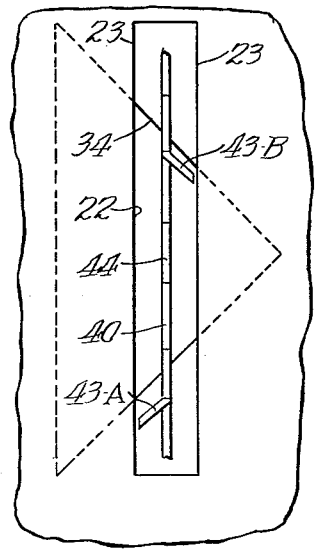
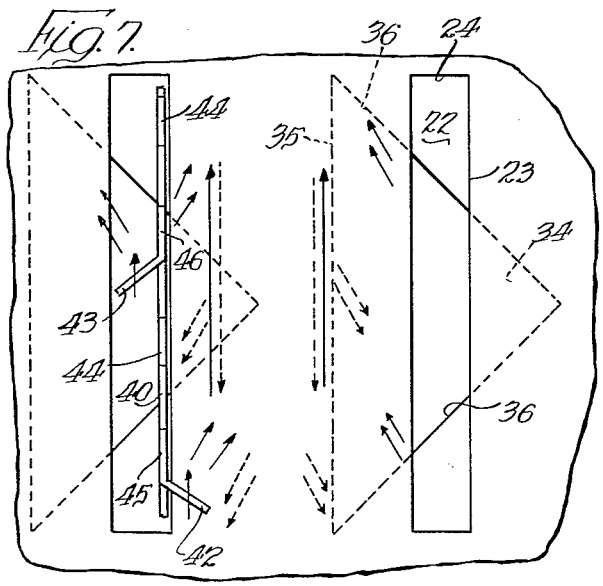
INVENTOR.
Edmond A. Juzwiak
BY
Kegan and Kipnis
Attys:

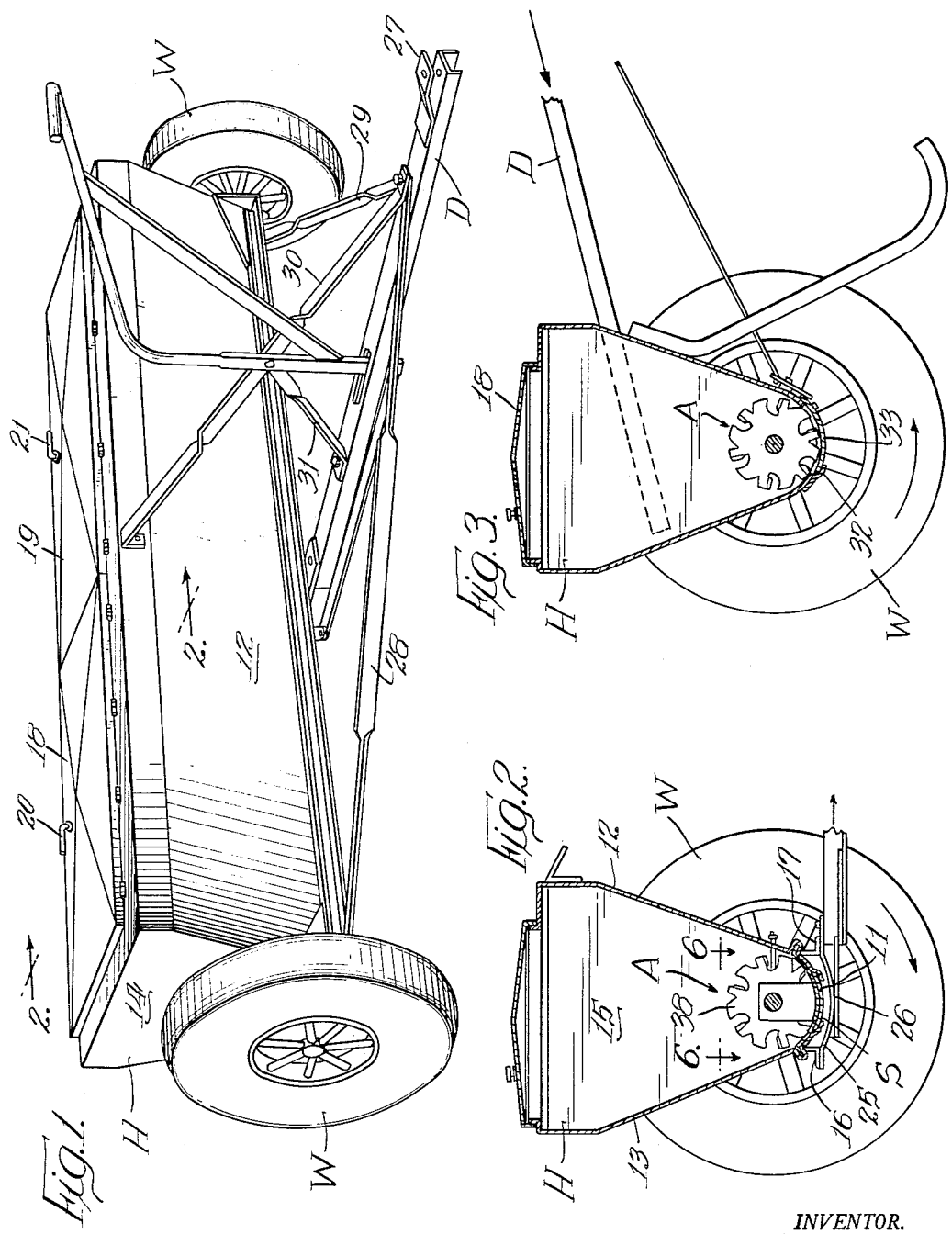

United States Patent Office 2,715,482
Patented Aug. 16, 1955

2,715,482

FERTILIZER SPREADERS AND THE LIKE

Edmond A. Juzwiak, Chicago, Ill., assignor to Avco Manufacturing Corporation, New York, N. Y., a corporation of Delaware Application July 23, 1953, Serial No. 369,904

4 Claims. (Cl. 222—177)

This invention relates to fertilizer spreaders and the like and particularly to an improved feed and agitator member in such spreader.

In devices of this kind, measured quantities of materials such as solid fertilizers, grass seeds and the like have to be provided in suitable form and be discharged from adjustable openings by movable agitators. Many of the fertilizers are difficult to keep, measure and discharge, for instance, they often tend to clog the openings, to corrode and erode solid parts, and cause other troubles. Considerable improvement has been made with respect to the elimination of these problems, in accordance with my Patent No. 2,510,231 issued June 6, 1950, entitled "Spreader." More particularly, said patent teaches the use of means and operations for forcibly charging the openings with quantities of fertilizer and the like, in alternation with means and operations for forcibly driving portions of the charged material through the openings.

I have now discovered that further improvement is possible, mainly over the powerful charging of the discharge opening as disclosed in my said earlier patent. Strangely enough, while positive charging, in conjunction with the alternating discharge operations, is still important, I have now discovered that it is best to direct the charging movements laterally away from the discharge ports, rather than to the same, so far as physical movements in the direct vicinity of these openings are concerned. This can be done by directing certain impeller vanes so that they work in effect backwards, as compared with the arrangement in my said earlier patent. It appears that, ultimately, the material still moves toward the discharge ports. An indirect impelling of the material to these ports is obtained in this manner.

I have also found it possible so to design the feed and agitator unit, performing these and other movements so as to prevent material caking up and building up to the sides of the disc, thereby eliminating cleaning, maintenance and replacement problems.

Moreover, I have found that the agitator and feeder unit, improved in these various respects, can be produced at no added cost or in some instances at an actual saving.

Thus it is the principal object of this invention to counteract the dangers of clogging, corrosion, erosion, etc., more efficiently. It is another important object at the same time to insure minimum cost and maximum service life, under the difficult conditions encountered.

In order that my invention may be more fully disclosed, reference is had to the accompanying drawings which illustrate apparatus embodying the foregoing principles and other features to be pointed out as this description proceeds, or which are inherent in this invention. For purposes of clarity the description is explicit and the drawings are detailed, but it is to be understood that such exposition is illustrative only and that my invention is not restricted to the particular details described or shown.

In the drawings:

Figure 1 is a perspective view of a power-actuated spreader embodying the present invention.

Figure 2 is a fragmentary elevation of said spreader, in section, taken on the line 2—2 of Figure 1.

Figure 3 is a view generally similar to Figure 2, but showing a modified manually-operated spreader.

Figure 4 is an enlarged detail from Figure 2.

Figure 5 is a more enlarged sectional detail, the section being taken along the line 5—5 in Figure 4.

Figure 6 is an enlarged, fragmentary plan view of the detail of Figure 4, the view being taken along the line 6—6 in Figure 2.

Figure 7 is a more enlarged, diagrammatic representation of parts from Figure 6; and Figure 8 is a view generally similar to Figure 7, but showing a modified arrangement.

The complete fertilizer spreader comprises a hopper H in which fertilizer or other material is placed for distribution through openings OH; a shutter S on a lower part of the hopper, with openings OS for regulating the discharge area of the discharge openings in the hopper; an armature A rotatable within the hopper adjacent the discharge openings OH, OS; wheels W or other suitable means to movably support the hopper and the parts and materials therein or thereon; and a draw-bar and control means D to cause and control suitable movements of the hopper and of certain other parts. The present improvement relates to the agitator A and its cooperation with the discharge openings OH, OS; more particularly to the form and design as well as the manner of fabricating said agitator A.

Referring now particularly to Figures 1 and 2, the hopper H has an arcuate bottom plate 11, a front wall 12, a rear wall 13, and two end walls 14 and 15. A pair of angle irons 16 and 17 extend along the bottom plate 11 of the hopper H to stiffen and strengthen said bottom plate which must be kept at a predetermined distance from the agitator A. That is, there must be no appreciable local sagging of the plate 11 between the wheels W due to the variable weight of material in the hopper H; also, no appreciable vibration of the plate 11 as the machine travels over a more or less rough ground. Otherwise the armature cannot function properly. The hopper H is further provided with suitably hinged covers 18 and 19 having handles 20 and 21 in order to facilitate loading of the hopper with the material to be dispensed.

As best shown in Figures 6 and 7, the bottom plate 11 is perforated by a series OH of discharge openings 22, spaced and aligned in the direction from one wheel W to the other; said series extending substantially from one end wall 14 to the other 15. These openings are identical in form and size and shown as being rectangular, having relatively long sides 23 (parallel with the end walls 14, 15) and relatively short ends 24.

Slightly below the bottom plate 11, in the middle between the wheels W, a central bridge member 25 is provided, extending from one stiffener 16 to the other 17 and secured to the same, both in order to insure further stiffening and to securely attach the end 26 of the draw-bar D to the two stiffeners. This draw-bar extends forwardly from the bridge 25 and has a trailer hitch 27 at the forward end. Tie rods 28 and 29 may extend from a forward portion of the draw-bar to the ends of the stiffeners 16 and 17 and an additional tie rod 30 may extend from the same portion to a central upper part of the hopper H, with further reinforcement by a brace 31.

In order to allow adjustment of the effective size of the openings 22 by a shutter assembly S, shutter-retaining strips 32 are secured to the under side of the bottom plate 11, to provide firm support for one or several shutter plates 33, while allowing the shutter plate to be shifted longitudinally of the hopper H, that is, from one end 14 to the other 15 or reversely. The shutter plate is perforated by a series OS of apertures 34, spaced and aligned in the same manner as the discharge openings 22 in the bottom plate 11. Each shutter opening 34 is shown as being triangular, having one side 35 parallel with the long sides 23 of a hopper opening. The shutter openings have other sides 36 converging symmetrically from the ends of the sides 35. Thus by a slight displacement of the shutters longitudinally of the hopper H, widely variable portions of the length of each hopper opening 22 can be exposed for actual discharge.

The agitator A as best shown in Figures 4 and 5 comprises a drive shaft 37 extending longitudinally of the hopper H, slightly below the center line or axis of curvature of the curved bottom plate 11 and suitably extending through the end walls 14 and 15. Bearings for the shaft are provided by the two end walls and additional bearing means are desirably provided, for instance, by a block 38 (Figure 2) secured to the bottom wall 11 adjacent the central bridge 25. Desirably the spacing and location of such bearings are approximately the same as that of the ends and transverse reinforcement means 25 of the stiffeners 16 and 17 for the bottom plate 11, in order to secure full control over any vibratory as well as static bending and displacement between the armature A and the bottom plate 11. Details of the bearing construction for the shaft need not be described herein, being well known from my said earlier patent. The hubs 39 of the wheels W are rigidly secured to the ends of the shaft 37.

The armature comprises a series of discs 40 coaxially secured to and spaced along the shaft 37 at distances identical with those between the hopper openings 22. Preferably each disc 40 is positioned and rotatable between two planes, transverse of the shaft; one of said planes including a long side 23 of the corresponding opening 22 and the other plane being parallel therewith and spaced therefrom beyond the other long side of the opening 22, as best shown in Figure 7.

Notches or slots 41 are formed in the outer peripheral part of every disc 40. They are peripherally distributed over the disc at uniform angular distances from one another, thereby providing the possibility of bending a small portion of the integral disc stock out of the flat plane of the disc and thereby to form an agitator or material charging element. Substantially identical vanes are formed on both sides. However, alternate vanes 42, bent to one side of the disc, are machined to a slightly smaller diameter than the disc has in general, whereas the other vanes 43, bent to the other side of the disc, have the full diameter of the disc. The extension of these latter vanes 43, laterally of the disc, is slightly less than the width of the corresponding slots 22 (along the sides 24), and the lateral width of the other alternate vanes 42 may be similar.

The outermost periphery of disc 40 and vane 43 is defined by a radius which is slightly shorter than the radius of curvature of the bottom plate 11, since the shaft 37, as noted above, is installed slightly below said center line. Thus the peripheral edge portions of the full radius vanes 43 can actually enter into the openings 22, and move between the edges of these openings, barely missing contact with the shutter S. Directly below the shaft, the vanes 43 move very closely along the shutter plate 33. Closer to the ends 24 of the hopper openings 22, the vanes move away from the shutter plate and out of the openings 22, due to their relatively small curvature and the relatively longer radius of curvature of the bottom plate. The short radius vanes 42 move similarly along the hopper bottom plate 11.

Inspection of Figure 7 shows that each vane 42 and 43 is laterally bent into a plane intersecting the general flat plane of the disc 40 at an obtuse angle with the leading part of the disc (referring to the travelling direction of the disc; said direction being shown by long full-line arrows). As a result, granular and powderous material and the like, within the hopper H, is impelled by each vane in oblique directions, substantially away from the openings 22 associated with the disc, as shown by short full-line arrows. This is one of the features of the present invention which I found to be particularly advantageous and which is obtained very simply and cheaply by the new agitator as shown.

Countermovements and return movements of the material are likely to occur, as shown by dotted arrows in Figure 7. Such movements are due to physical forces acting within the material itself and also due to the reverse travel of the agitator discs in their upper parts. Charging of the discharge openings 22 in accordance with my said earlier patent is provided, in modified manner, by these countercurrent or return movements, subject to the influence of the impulses driving the material away from the openings, as shown and described.

Teeth 44 are provided on the full radius periphery of each disc 40, between the vanes 42, 43 and the disc portions 45, 46 carrying the same. For this purpose additional notches 47 are recessed into the periphery of the disc, as clearly shown in Figure 4. These teeth 44, together with the vane-carrying disc portions 45 and 46, operate to positively discharge or punch out the material previously charged into the openings, as known from my said earlier patent. In this respect the teeth are also assisted by the full radius vanes 43.

As shown in Figure 8, it is alternatively possible to orient the principal flat plane of a disc 40 in the approximate center line between the long sides 23 of the corresponding hopper opening 22. In that event identical full radius vanes 43A, 43B can be provided on both sides of the disc. This construction is useful mainly when the machine and the openings are relatively large. In cases where relatively narrow openings 22 are required, the construction according to Figure 7 is preferred.

Each disc 40 is attached to the shaft 33 by an integral hub 48, which can be formed by the same pressing operation which also forms the notches 41, 47 and vanes 42, 43. As best shown in Figure 5, it is preferred that the center hole, of hub 48, as originally formed, be slightly smaller than the outer diameter of the shaft 37, whereby a firm press fit can be obtained between the shaft and each disc, strong enough to hold the disc against lateral sliding in spite of the appreciable force reactions imposed by the agitation of granular fertilizer or the like.

Incident to prolonged operation, chemicals as well as humidity tend to work themselves into the corners 49 formed between the shaft 37 and hub 48. If such action were allowed, an originally firm seating engagement for the discs would become faulty after a short time. Therefore, and for the general protection of the shaft and agitator, I prefer to cover or plate the complete assembly of the shaft 37 and discs 40 with a substantial deposit 50 of galvanizing material or the like.

The operation of the different parts has been sufficiently disclosed in the foregoing description. I therefore believe it will be sufficient at this point to say that, as the new device is propelled by the draw-bar or pusher rod D, the wheels W and shaft 37 rotate the discs 40 adjacent the bottom plate 11.

This rotation has a number of desirable effects, which are obtained in improved manner and with great simplicity. Materials tending to agglomerate into pebbles are ground up and kept in finely granulated form, so that they can be discharged through relatively small openings. While this operation tends to heat the agitator A and bottom plate 11, accurate space relationship is maintained between these parts. The granular, powdered or similar material is indirectly charged into the effective discharge openings, thereby avoiding clogging tendencies most safely; otherwise, clogging tends to start in the ends of the openings 22 partly closed by the shutter plate 33, and ultimately to progress into the effective openings.

This new indirect charging method insures the feed of properly dischargeable material through the openings, as well as the removal therefrom of large obstructing pebbles, which otherwise tend to catch in the corners between the bottom and shutter plates 11, 33.

Strong discharge forces are applied by the teeth 44 and similarly oriented disc portions 45, 46. In this manner, accurately measured discharge of fertilizers and other materials, kept in proper physical condition, is safeguarded in an improved manner.

Various modifications can be applied. I claim:

1. In a fertilizer spreader having an elongated hopper with longitudinally spaced discharge openings in a curved bottom plate, said openings being elongated transversely of the hopper and adjustably closed and opened by a longitudinally movable, underlying shutter plate, an armature comprising: a shaft extending in and along the hopper adjacent and below the center of curvature of the bottom plate; means to impart rotation to said shaft; and fertilizer laterally deflecting and discharge discs, each in register with a discharge opening, said discs being secured to and longitudinally spaced successively along the shaft, each disc comprising an inner, substantially flat, centrally apertured plate of circular shape, the maximum radius of which is such as to barely miss contact with the shutter plate, a series of similarly flat, peripherally distributed fertilizer discharge teeth integral with the inner plate, extending outward to the maximum diameter of the disc, adapted on said rotation to enter into the respective discharge openings between the side edges thereof, and a series of peripherally located and distributed fertilizer agitator vanes on said flat plate, arranged so that adjacent vanes are skewed in opposite senses and at obtuse angles with the leading part of said plate referring to the direction of said rotation, whereby said vanes on said rotation tend directly to deflect fertilizer from the respective openings, said openings being adapted to be indirectly charged with fertilizer by said rotation of adjacent discs.

2. A fertilizer spreader as described in claim 1 wherein each disc has a series of said vanes on both sides thereof, with substantially identical angularities with the flat plate and substantially similar vane areas on both sides.

3. A fertilizer spreader as described in claim 2 wherein the vanes on one side of the disc have shorter radius than those on the other side, those on the other side having the full radius of said teeth and being adapted to enter into said discharge openings between their side edges; the teeth being adapted to move along one of said side edges.

4. A fertilizer spreader as described in claim 1 wherein each of said discs has a hub portion substantially consisting in a ring laterally pressed out of the flat plane of said plate, press fitted on said shaft; the entire armature being plated after such press fitting so as to prevent access of material tending to cause corrosion or erosion or both, to said hub and the other parts of the armature.

References Cited in the file of this patent

UNITED STATES PATENTS

| | | |
|---|---|---|
| 2,510,231 | Juzwiak | June 6, 1950 |
| 2,541,008 | Stahmer | Feb. 6, 1951 |
| 2,626,729 | Ajero | Jan. 27, 1953 |
| 2,661,124 | Ajero | Dec. 1, 1953 |